(12) United States Patent
Miyahara et al.

(10) Patent No.: US 9,205,417 B2
(45) Date of Patent: Dec. 8, 2015

(54) ZEOLITE MEMBRANE REGENERATION METHOD

(71) Applicant: NGK Insulators, Ltd., Nagoya (JP)

(72) Inventors: Makoto Miyahara, Nagoya (JP); Makiko Ichikawa, Nagoya (JP); Shinji Nakamura, Nagoya (JP); Ryujiro Nagasaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/696,701

(22) Filed: Apr. 27, 2015

(65) Prior Publication Data

US 2015/0224487 A1 Aug. 13, 2015

Related U.S. Application Data

(63) Continuation of application No. PCT/JP2013/079714, filed on Nov. 1, 2013.

(30) Foreign Application Priority Data

Nov. 1, 2012 (JP) ................. 2012-241960

(51) Int. Cl.
| | |
|---|---|
| *B01J 38/02* | (2006.01) |
| *B01J 29/90* | (2006.01) |
| *B01D 65/02* | (2006.01) |
| *B01D 71/02* | (2006.01) |
| *B01D 69/12* | (2006.01) |
| *B01J 35/04* | (2006.01) |

(52) U.S. Cl.
CPC .................. *B01J 29/90* (2013.01); *B01D 65/02* (2013.01); *B01D 69/12* (2013.01); *B01D 71/028* (2013.01); *B01J 35/04* (2013.01); *B01J 38/02* (2013.01); *B01D 2321/32* (2013.01); *B01D 2325/12* (2013.01)

(58) Field of Classification Search
CPC ....................................... B01J 38/02
USPC ....................................... 502/56
See application file for complete search history.

(56) References Cited

U.S. PATENT DOCUMENTS

| | | |
|---|---|---|
| 2004/0173094 A1 | 9/2004 | Nakayama et al. |
| 2005/0229779 A1 | 10/2005 | Nakayama et al. |
| 2008/0047432 A1 | 2/2008 | Nonaka et al. |
| 2010/0144512 A1 | 6/2010 | Uchikawa et al. |
| 2012/0272826 A1 | 11/2012 | Uchikawa et al. |
| 2014/0021129 A1 | 1/2014 | Teranishi et al. |

FOREIGN PATENT DOCUMENTS

| | | |
|---|---|---|
| JP | 08-243383 A1 | 9/1996 |
| JP | 2003-093856 A1 | 4/2003 |
| JP | 2003-159518 A1 | 6/2003 |
| JP | 2004-066188 A1 | 3/2004 |
| JP | 2004-105942 A1 | 4/2004 |
| JP | 2005-053747 A1 | 3/2005 |
| JP | 2008-074695 A1 | 4/2008 |
| JP | 2010-158665 A1 | 7/2010 |
| JP | 2012-045484 A1 | 3/2012 |
| WO | 2011/105511 A1 | 9/2011 |
| WO | 2012/128217 A1 | 9/2012 |

OTHER PUBLICATIONS

International Search Report and Written Opinion (Application No. PCT/JP2013/079714) dated Dec. 3, 2013.
English translation of the Written Opinion of the International Searching Authority, International Application No. PCT/JP2013/079714, dated Dec. 3, 2013 (5 pages).
den Exter, M. J., et al. "Separation of Permanent Gases on the All-Silica 8-Ring Clathrasil DD3R," *Studies in Surface Science and Catalysis*, vol. 84, dated 1994, pp. 1159-1166 (8 pages).

*Primary Examiner* — Edward Johnson
(74) *Attorney, Agent, or Firm* — Burr & Brown, PLLC

(57) ABSTRACT

Provided is a simple method for regenerating a zeolite membrane which has been exposed to water. The method for regenerating a zeolite membrane is a method for regenerating a zeolite membrane which is formed on a ceramic porous body and subjected to removal treatment of structure directing agent. Heating is performed at a regeneration temperature at which the difference in ratio of thermal expansion amount between the ceramic porous body and the zeolite membrane is 0.3% or less when 40° C. is set as datum. The regeneration temperature is preferably a temperature not exceeding the oxidative pyrolysis temperature of the structure directing agent used in the formation of the zeolite membrane.

8 Claims, 3 Drawing Sheets

ZEOLITE MEMBRANE REGENERATION METHOD

TECHNICAL FIELD

The present invention relates to a method for regenerating a zeolite membrane which is formed on a ceramic porous body and subjected to treatment of removing structure directing agent.

BACKGROUND ART

In recent years, ceramic filters have been used in order to selectively collect only specific components from a multi-component mixture (mixed fluid). The ceramic filters are excellent in mechanical strength, durability, corrosion resistance, and the like as compared with organic polymer filters, and thus preferably applied to water treatment and exhaust gas treatment, or to the removal of suspended matters, bacteria, dust, and the like in liquids and gases in a wide range of fields such as medicinal and food fields.

Ceramic porous bodies with zeolite membranes formed thereon are known as such filters.

Zeolite is known to adsorb water molecules in its pores, and when the zeolite membranes are used as separation membranes, there is concern that water molecules may block the pores and decrease the permeation amount.

Known are: a method of draining the inside of pores by heating zeolite powders or particles (Patent Document 1); a regeneration method of removing a protective membrane coated on a zeolite separation layer (Patent Document 2); a method of immersion in water (Patent Document 3), and the like.

CITATION LIST

Patent Documents

[Patent Document 1] JP-A-8-243383
[Patent Document 2] JP-A-2003-93856
[Patent Document 3] JP-A-2012-45484

SUMMARY OF THE INVENTION

Problem to be Solved by the Invention

However, Patent Document 1 is directed to an adsorption layer of zeolite formed on a carrier, but not intended to regenerate a zeolite membrane formed on a ceramic substrate, and there is thus concern that cracks may be caused by the difference in coefficient of thermal expansion between the substrate and the zeolite membrane, or the zeolite membrane cannot be regenerated sufficiently depending on the membrane thickness. In addition, Patent Document 2 is directed to a regeneration method of forming a polyimide coating membrane on the surface of a zeolite membrane and removing the coating membrane, but not intended to regenerate the zeolite membrane itself. Moreover, Patent Document 3 regenerates a zeolite membrane by immersion in water, but takes a long time to regenerate the membrane while organic matters are removed by exposure to water without any difficulty, because water separation is supposed. When water in the pores decreases the permeation amount (in the case of use for gas separation or separation in a system containing no water), it is difficult for such methods to restore the permeation amount.

An object of the present invention is to provide a simple method for regenerating a zeolite membrane, which regenerates the zeolite membrane which has been exposed to water.

Means for Solving the Problem

In order to solve the problems mentioned above, according to the present invention, the following method for regenerating a zeolite membrane is provided.

[1] A method for regenerating a zeolite membrane formed on a ceramic porous body and subjected to treatment of removing structure directing agent, the method including heating at a regeneration temperature at which a difference in ratio of thermal expansion amount between the ceramic porous body and the zeolite membrane is 0.3% or less when 40° C. is set as datum.

[2] The method for regenerating a zeolite membrane according to [1], wherein the regeneration temperature does not exceed an oxidative pyrolysis temperature of the structure directing agent used in the formation of the zeolite membrane.

[3] The method for regenerating a zeolite membrane according to [1] or [2], wherein a rate of temperature increase to the regeneration temperature or a rate of temperature decrease from the regeneration temperature is 1° C./h to 100° C./h.

[4] The method for regenerating a zeolite membrane according to any of [1] to [3], wherein a keeping time at the regeneration temperature is 10 minutes or longer.

[5] The method for regenerating a zeolite membrane according to any of [1] to [4], wherein the ceramic porous body has a monolith shape including a plurality of cells defined and formed by porous partition walls from one end face to the other end face in the longitudinal direction.

[6] The method for regenerating a zeolite membrane according to any of [1] to [5], wherein the zeolite membrane is a DDR-type zeolite membrane.

[7] The method for regenerating a zeolite membrane according to any of [1] to [6], wherein heating is performed at the regeneration temperature at which the difference in ratio of thermal expansion amount between the ceramic porous body and the zeolite membrane is 0.05 to 0.23% when 40° C. is set as datum, and the permeation amount recovery rate, defined by (permeation amount after regeneration of the zeolite membrane)/(permeation amount before regeneration of the zeolite membrane)×100, of gas that permeates through pores of the zeolite membrane is 120% or higher.

[8] The method for regenerating a zeolite membrane according to [7], wherein the gas that permeates through the pores of the zeolite membrane is any of $H_2$, He, $N_2$, $CO_2$, and $CH_4$.

Effect of the Invention

Heating at the regeneration temperature at which the difference in ratio of thermal expansion amount between the ceramic porous body and the zeolite membrane is 0.3% or less when 40° C. is set as datum can restore the permeation amount of the zeolite membrane which has been exposed to water. More particularly, heating at this temperature can restore the permeation amount to almost the value before the exposure, without causing a crack in the zeolite membrane (without lowering the separation coefficient).

MODE FOR CARRYING OUT THE INVENTION

Embodiments of the present invention will be described below with reference to the drawings. The present invention is not limited to the following embodiments, but changes, modifications, and improvements can be made without departing from the scope of the invention.

1. Summary of Zeolite Membrane Regeneration Method

The zeolite membrane regeneration method according to the present invention is a method for regenerating a zeolite membrane which is formed on a ceramic porous body and subjected to treatment of removing structure directing agent. Heating is performed at a regeneration temperature at which the difference in ratio of thermal expansion amount between the ceramic porous body and the zeolite membrane is 0.3% or less when 40° C. is set as datum. The ratio of thermal expansion amount refers to a thermal expansion coefficient at a temperature t° C. when 40° C. is set as datum in the case of increase from room temperature (40° C.) to a given temperature t° C. The difference in ratio of thermal expansion amount refers to the difference between the thermal expansion coefficient of the ceramic porous body at t° C. and the thermal expansion coefficient of the zeolite membrane at t° C. As such, setting the temperature t° C. at which the difference in ratio of thermal expansion amount is 0.3% or less when 40° C. is set as datum as regeneration temperature, and heating at this regeneration temperature can restore the permeation amount of the zeolite membrane which has been exposed to water, to almost the value before the exposure.

First, a monolith type separation membrane structure will be described as a separation membrane structure of a zeolite membrane formed on a ceramic porous body, which is regarded as a target for the method for regenerating a zeolite membrane according to the present invention. The monolith type separation membrane structure has a zeolite membrane formed on a monolith type ceramic porous body including a plurality of cells defined and formed by a porous partition wall from one end face to the other end face in the longitudinal direction. The monolith type separation membrane structure will be described, and the method for regenerating a zeolite membrane will be then described.

It is to be noted that the separation membrane structure regarded as a target for the method for regenerating a zeolite membrane according to the present invention is not limited to the monolith type separation membrane structure. More specifically, in the method for regenerating a zeolite membrane according to the present invention ceramic porous bodies having any shape can be used, as long as the zeolite membrane is formed on the ceramic porous body and subjected to treatment of removing structure directing agent.

2. Separation Membrane Structure

Figure 1:
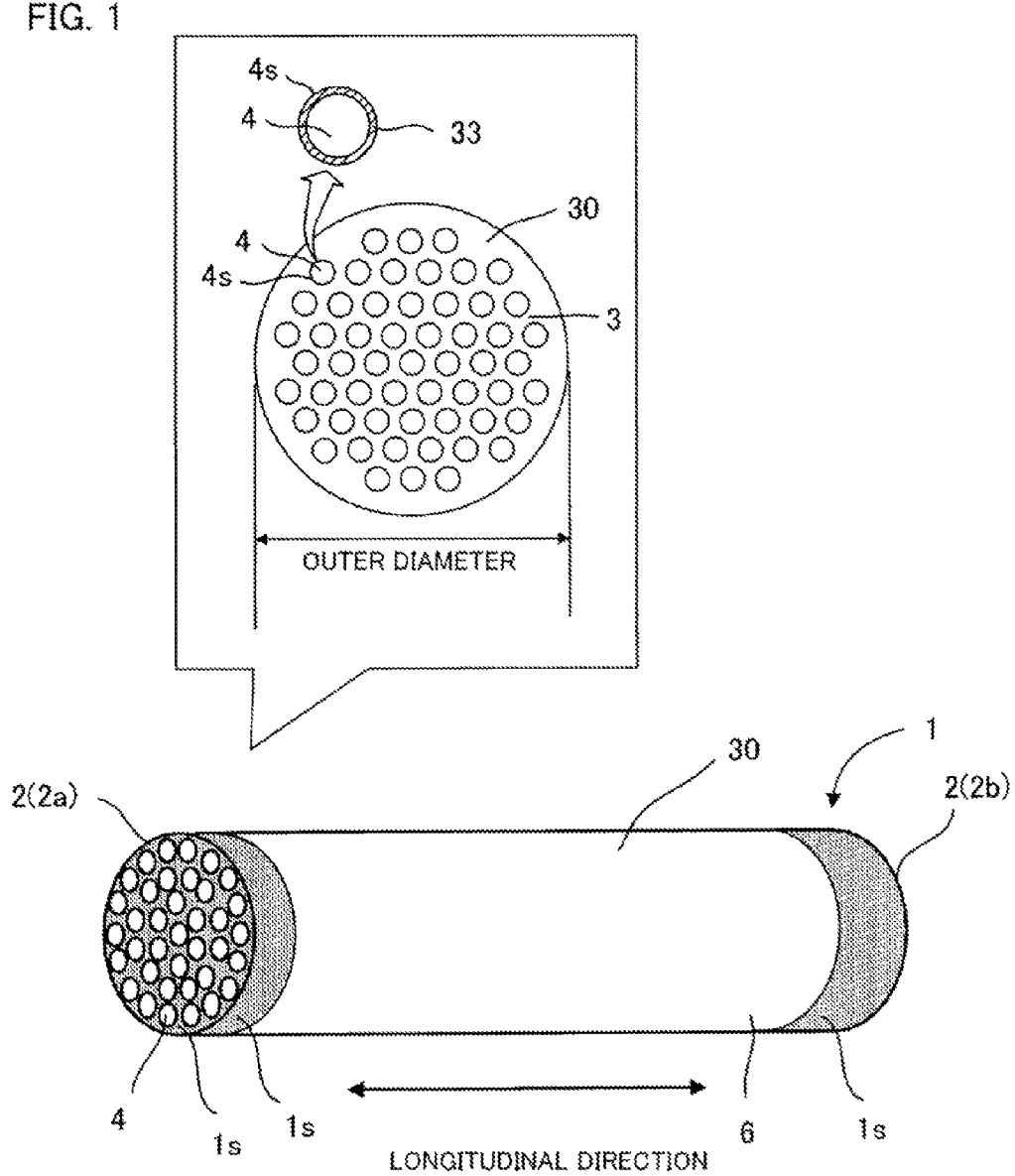
FIG. 1 is a view showing an embodiment of a separation membrane structure.

FIG. 1 shows a monolith type separation membrane structure as an embodiment of the separation membrane structure 1. The monolith type separation membrane structure 1 includes a monolith type substrate 30 (monolith substrate) and a separation membrane 33 (the substrate 30 is referred to as ceramic porous body 9 (or simply as porous body 9) in this specification.). The "monolith type substrate (monolith substrate)" refers to a substrate in a shape with a plurality of cells formed from one end face to the other end face in the longitudinal direction, or in a honeycomb shape.

The separation membrane structure 1 has a partition wall 3 formed of porous ceramic and having a large number of pores formed therein, and cells 4 serving as through channels for fluids are formed by the partition wall 3.

(Substrate)

The material of the substrate 30 is preferably a ceramic porous body. More preferably, the aggregate particles are alumina ($Al_2O_3$), titania ($TiO_2$), mullite ($Al_2O_3.SiO_2$), Scherben, cordierite ($Mg_2Al_4Si_5O_{18}$), and the like. Among these, further preferred is alumina which raw materials (aggregate particles) with controlled particle diameters are easily available, which can form stable kneaded materials, and which has high corrosion resistance.

The substrate 30 has a round pillar outer shape, and has an outer circumferential face 6, while the overall shape or size of the substrate 30 is not particularly limited as long as the separating function is not inhibited. Examples of the overall shape include shapes such as, for example, round pillar shapes, quadrangular pillar shapes (tubular shapes with a quadrangular cross section perpendicular to the central axis), and triangular pillar shapes (tubular shapes with a triangular cross section perpendicular to the central axis). Above all, the round pillar shapes are preferred which are easily extruded, less deformed by firing, and easily sealed with housings. In the case of use in microfiltration or ultrafiltration, the substrate preferably has a round pillar shape with a diameter of 30 to 220 mm in cross section perpendicular to the central axis and a length of 150 to 2000 mm in the direction of the central axis. As an embodiment of the substrate 30, a monolith type (monolith shape) is given as shown in FIG. 1. Alternatively, the substrate 30 may have a hollow cylindrical shape (see FIG. 3).

The substrate 30 shown in FIG. 1 according to the embodiment has the plurality of cells 4 defined and formed by the porous partition walls 3 from one end face 2a to the other end face 2b in the longitudinal direction and serving as through channels for fluids. The substrate 30 has 37 to 2500 cells 4 parallel to the longitudinal direction, which pass through both end sides in the longitudinal direction.

Examples of the cross-sectional shapes (the shapes in the cross sections perpendicular to the extending direction of the cells 4) of the cells 4 in the substrate 30 can include, for example, circular shapes, elliptic shapes, and polygonal shapes, and the polygonal shapes can include quadrangular shapes, pentagonal shapes, hexagonal shapes, and triangular shapes. It is to be noted that the extending direction of the cells 4 is the same as the direction of the central axis when the substrate 30 has a round pillar (cylindrical) shape.

When the cells 4 of the substrate 30 are circular in cross-sectional shape, the cells 4 are preferably 1 to 5 mm in diameter. When the diameter is 1 mm or more, the membrane area can adequately be ensured. When the diameter is 5 mm or less, an adequate strength can be obtained.

A plurality of layers having varied average particle diameter may also be provided on the substrate 30. More particularly, an intermediate layer 31 and a surface layer 32 having small average particle diameter may also be laminated on the substrate 30. Specifically, the intermediate layer 31 is placed on the surface of the substrate 30, the intermediate layer 31 including a large number of pores formed thereon, and having an average pore diameter smaller than the average pore diameter of the surface of the substrate 30. At least a part of the substrate 30 of the porous body 9 and the intermediate layer 31 preferably has a structure where aggregate particles are bonded to each other with an inorganic bonding material component. Furthermore, the surface layer 32 is placed on the surface of the intermediate layer 31, the surface layer 32 having an average pore diameter smaller than the average pore diameter of the surface of the intermediate layer 31. When the intermediate layer 31 and the surface layer 32 are provided, these included are regarded as the porous body 9.

Both of the end faces 2a and 2b of the substrate 30 are preferably provided with a sealing portion 1s. When the sealing portion 1s is provided as just described, it can prevent the mixture from partially flowing into the substrate 30 directly from the end faces 2 of the substrate 39 without passing through the separation membrane 33, and mixing with the gas or the like which has passed through the separation membrane 33 and discharged from the outer circumferential face 6. Examples of the sealing portion 1s can include, for example, glass seals and metal seals.

(Separation Membrane)

Figure 3:
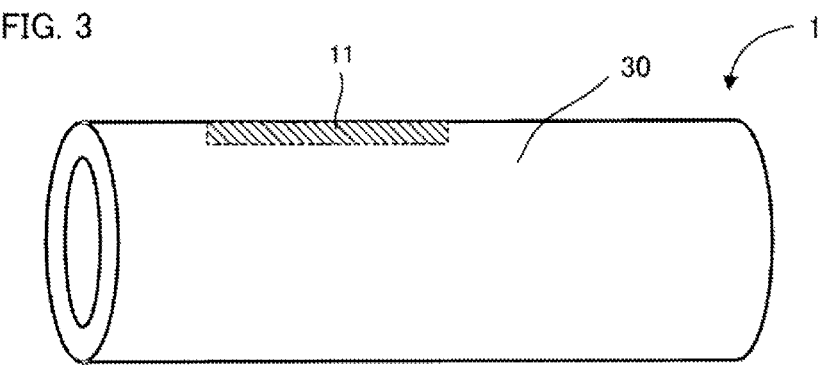
FIG. 3 is a perspective view showing an embodiment of a cylindrical substrate.

The separation membrane 33 is placed on the wall surface (the surface of the partition walls 3) inside the cells 4 (see FIG. 1), the separation membrane 33 including a plurality of pores formed therein, and having an average pore diameter smaller than that of the porous body 9 (substrate 30). Alternatively, the separation membrane 33 may be placed on the outer circumferential face of the hollow cylindrical substrate 30 as shown in FIG. 3.

The average pore diameter of the separation membrane 33 can be determined appropriately, depending on the required filtration performance or separation performance (the particle diameter of the substance to be removed). For example, in the case of a ceramic filter for use in microfiltration or ultrafiltration, the average pore diameter is preferably 0.01 to 1.0 µm. In this case, the average pore diameter of the separation membrane 33 is a value measured by airflow method as set forth in ASTM F316.

The separation membrane 33 is a zeolite membrane. As the zeolite, zeolite having a crystalline structure such as LTA, MFI, MOR, FER, FAU, DDR, CHA, and BEA can be used. When the separation membrane 33 is DDR-type zeolite, the membrane can be used, in particular, as a gas separation membrane that is used for selectively separating carbon dioxide.

3. Manufacturing Method (Substrate)

Next, a method for manufacturing the separation membrane structure 1 with the monolith type substrate 30 will be described. First, a raw material for the porous body is formed. For example, the material is extruded with the use of a vacuum extruder. Thus, a monolith type unfired substrate 30 having cells 4 is obtained. Besides, there are press molding, casting, or the like which can be selected appropriately. Then, the unfired substrate 30 is fired, for example, at 900 to 1450° C.

(Separation Membrane)

(Zeolite Membrane)

Next, on the inner wall faces 4s of the cells 4, a zeolite membrane is provided as the separation membrane 33.

The zeolite membrane for use in the present invention can be synthesized by a conventionally known method. For example, a solution (sol) of raw materials such as a silica source, an alumina source, a structure directing agent, an alkali source, and water is prepared, a substrate and the blended solution (sol) of raw materials are put in a pressure resistant vessel, and these are then put in a dryer and subjected to heat treatment (hydrothermal synthesis) at 100 to 200° C. for 1 to 240 hours to produce a zeolite membrane. At that time, zeolite is preferably applied as seed crystals in advance to the substrate.

Next, the porous body 9 with the zeolite membrane formed is washed with water, or washed with hot water at 80 to 100° C., and the washed body is taken out, and dried at 80 to 100° C. Then, the porous body 9 is put in an electric furnace, and heated for 1 to 200 hours at 450 to 800° C. which is equal to or higher than the oxidative pyrolysis temperature of the structure directing agent in the air atmosphere to burn and remove the structure directing agent in the pores of the zeolite membrane. As just described, the zeolite membrane can be formed.

Examples of the silica source include colloidal silica, tetraethoxysilane, liquid glass, silicon alkoxide, fumed silica, and precipitated silica.

The structure directing agent is used for forming the pore structure of the zeolite. Examples of the agent include, but not limited thereto, organic compounds such as tetraethyl ammonium hydroxide, tetraethyl ammonium bromide, 1-adamantane amine, tetrapropyl ammonium hydroxide, tetrapropyl ammonium bromide, and tetramethyl ammonium hydroxide.

Examples of the alkali source include alkali metals such as sodium hydroxide, lithium hydroxide, and potassium hydroxide, alkaline-earth metals such as magnesium hydroxide and calcium hydroxide, and quaternary ammonium hydroxide.

4. Separation Method

The separation membrane structure 1 can separate some constituents from a fluid of multiple kinds mixed. The fluid to be treated, which has flowed into the cells 4 of the separation membrane structure 1, permeates through the separation membrane (zeolite membrane) 33 to become a treated fluid and is then discharged from the outer circumferential face 6 of the substrate 30 to the outside of the substrate 30.

5. Zeolite Membrane Regeneration Method.

The method for regenerating a zeolite membrane according to the present invention restores the permeation amount of the zeolite membrane which has been exposed to water. Heating is performed at a regeneration temperature at which the difference in ratio of thermal expansion amount between the ceramic porous body 9 and the zeolite membrane is 0.3% or less when 40° C. is set as datum. The difference in ratio of thermal expansion amount is preferably 0.01 to 0.25%, more preferably 0.05 to 0.20%. Heating at the regeneration temperature at which the difference in ratio of thermal expansion amount falls within this range can prevent the breakage of the zeolite membrane due to the difference in thermal expansion amount. Furthermore, the heating can efficiently burn the water molecules off without increasing defects, and restore the permeation amount of the zeolite membrane. It is to be noted that when the ceramic porous body 9 is formed of a plurality of layers, the difference in ratio of thermal expansion amount is 0.3% or less between the layer with the zeolite membrane formed thereon (the layer in contact with the zeolite membrane) and the zeolite membrane. When the surface layer 32 is formed, and when the zeolite membrane is formed on the surface layer 32, the difference refers to the difference in ratio of thermal expansion amount between the surface layer 32 and the zeolite membrane. For example, when the ceramic porous body 9 is alumina, and the zeolite membrane is a DDR membrane, it is approximately 570° C. at which the difference in ratio of thermal expansion amount is 0.3%.

Now, a method for measuring the thermal expansion amounts of the porous body 9 and zeolite membrane will be described. First, as for the porous body 9, for measuring the thermal expansion amount of the porous body 9, as long as the porous body 9 before the zeolite membrane is formed can be prepared, it is cut out as follows as a thermal expansion amount measurement sample 11, which is subjected to the measurement. On the other hand, when only the finished product with the zeolite membrane formed can be prepared, the product is cut out together with the zeolite membrane as a thermal expansion amount measurement sample 11, which is subjected to the measurement. Because the zeolite membrane is thin, the thermal expansion amount of the porous body 9 is adequately dominant, and substantially the same measurement value is obtained as for the porous body 9 alone.

Figure 2:
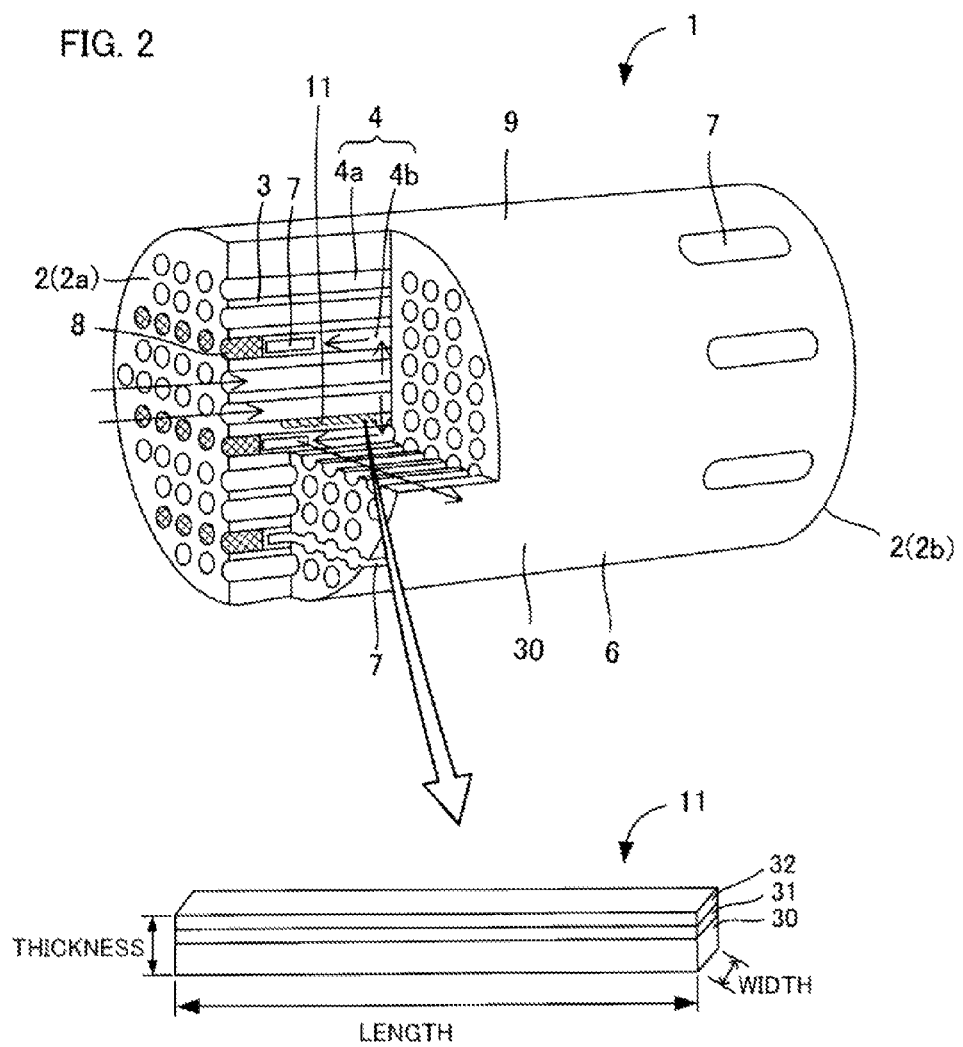
FIG. 2 is a perspective view showing other embodiment of a separation membrane structure.

In the case of the monolith type porous body 9 as shown in FIG. 2, the body is cut out as a thermal expansion amount measurement sample 11 so as to include the portion of cells 4 on which a zeolite membrane is to be formed (the details for the embodiment in FIG. 2 will be described later.). When a zeolite membrane is formed on the outer circumferential face of the hollow cylindrical porous body 9 as shown in FIG. 3, the body is cut out so as to include the outer circumferential face on which the zeolite membrane is to be formed. Likewise, when the intermediate layer 31 and the surface layer 32 are laminated on the substrate 30, the body is cut out as a thermal expansion amount measurement sample 11 so as to include the portion (surface layer 32) on which a zeolite membrane is to be formed. In this case, there is not always a need to include the intermediate layer 31 or the (extruded) substrate 30, as long as the sample shape can be ensured by the surface layer 32 alone. While the measurement is still possible even when the thermal expansion amount measurement sample 11 of the porous body 9 has a zeolite membrane formed as described above, the zeolite membrane is preferably 10 μm or less in thickness.

Next, as for the method for measuring the thermal expansion amount of the zeolite membrane, the zeolite membrane is cut out into an arbitrary shape, and subjected to the measurement. It is to be noted that because the zeolite membrane is typically thin, the structure of the zeolite membrane may be first identified by X-ray diffraction to prepare a self-supported membrane from the zeolite of identified structure, cut the membrane into an arbitrary shape, and measure the thermal expansion amount of the membrane, when the sample shape cannot be ensured by the zeolite membrane portion alone.

The regeneration temperature is preferably a temperature which does not exceed the oxidative pyrolysis temperature of the structure directing agent used in the formation of the zeolite membrane. In the case of preparing the zeolite membrane with the use of the structure directing agent, heating is performed at equal to or higher than the oxidative pyrolysis temperature in order to remove the structure directing agent. It is to be noted that the oxidative pyrolysis temperature is a temperature that causes the structure directing agent to undergo oxidative pyrolysis. More particularly, a zeolite powder including the structure directing agent is heated at 10° C./h to 100° C./h, and the temperature that causes a decrease in weight by 90% is defined as the oxidative pyrolysis temperature while the temperature at which the change in weight is convergent is regarded as 100%. For example, when 1-adamantane amine is used as the structure directing agent, the oxidative pyrolysis temperature is 425° C. In the samples which exhibit separation performance, breakage of the zeolite membrane is likely to occur when heating is again performed at equal to or higher than the oxidative pyrolysis temperature. Accordingly, the treatment at equal to or lower than the pyrolysis temperature of the structure directing agent can efficiently burn the water molecules off without increasing defects, and restore the permeation amount without degrading the separation performance.

The rate of temperature increase to the regeneration temperature or the rate of temperature decrease from the regeneration temperature is preferably 1° C./h to 100° C./h. More preferably, the rate is 3° C./h to 50° C./h, more preferably, 6° C./h to 25° C./h. The control of the rate of temperature increase or the rate of temperature decrease can restore the permeation amount without degrading the separation performance, while reducing the difference in thermal expansion, which is caused by the difference in thermal conductivity, and efficiently burning the water molecules off.

The keeping time at the regeneration temperature is preferably 10 minutes or longer. In other words, heating for 10 minutes or longer at the regeneration temperature is preferable. Heating for 120 to 480 minutes is preferable. By such range, the zeolite membrane even in a large-size product can uniformly be regenerated.

The regeneration method described above can make the recovery rate of the permeation amount of gas that permeates through pores of the zeolite membrane to 100% or higher. The gas that permeates through pores of the zeolite membrane is, for example, $H_2$, $He$, $N_2$, $CO_2$, or $CH_4$. The recovery rate herein refers to the permeation amount recovery rate of the value of the permeation amount regenerated by heating (after heating/after regeneration) when the value of the permeation amount decreased through use or by leaving in the air atmosphere (before heating/before regeneration) is regarded as 100%, which is calculated by the formula "Permeation Amount Recovery Rate=(Permeation Amount after Heating (after Regeneration))/(Permeation Amount before Heating (before Regeneration))×100".

In the regeneration method according to the present invention, by heating at the regeneration temperature at which the difference in ratio of thermal expansion amount between the ceramic porous body and the zeolite membrane is 0.05 to 0.23% when 40° C. is set as datum, it is able to achieve the permeation amount recovery rate, defined by (Permeation Amount after Regeneration of Zeolite Membrane)/(Permeation Amount before Regeneration of Zeolite Membrane)×100, of gas that permeates through pores of the zeolite membrane, to 120% or higher.

FIG. 2 shows other embodiment of the monolith type separation membrane structure 1 to which the method for regenerating a zeolite membrane according to the present invention can be applied. The present embodiment includes a plurality of separation cells 4a extending from one end face 2a to the other end face 2b formed in rows, and a plurality of water collection cells 4b formed from one end face 2a to the other end face 2b in rows. The separation cells 4a and water collection cells 4b of the separation membrane structure 1 are circular in cross-sectional shape. Furthermore, the openings of the separation cells 4a are opened (remain open) at both end faces 2a and 2b. The water collection cells 4b have plugging portions 8 formed by plugging openings at both end faces 2a and 2b with plugging members, and discharge passages 7 are provided so that the water collection cells 4b communicate with the external space. In addition, a separation membrane 33 is provided on the surfaces of inner wall faces 4s of the separation cells 4a.

EXAMPLES

The present invention will be described in further detail with reference to examples, but the present invention is not limited to these examples.

1. Method for Preparing Monolith Type Separation Membrane Structure

Monolith type substrates 30 were prepared, and separation membranes 33 (zeolite membranes) were formed in the cells 4 thereof. First, the preparation of the substrates 30 will be described.

(Substrate)

To 100 parts by mass of alumina particles (aggregate particles) of 50 µm in average particle diameter, 20 parts by mass of inorganic bonding material (sintering aid) was added, and water, dispersing agent, and thickener were further added, mixed and kneaded to prepare a kneaded material. The obtained kneaded material was extruded to prepare a monolith type unfired substrate 30.

Then, the substrate 30 was subjected to firing. The firing condition was 1250° C. for 1 hour, and the rates of temperature increase and temperature decrease were both 100° C./hour.

The porous body 9 has a round pillar outer shape, with an outer diameter of 30 mm, a cell diameter of 2.5 mm, the number of cells of 55, and a length of 160 mm.

Next, samples were prepared with DDR-type zeolite membranes (also referred to simply as a DDR membranes) formed as the separation membranes 33 on wall surfaces inside the cells 4 of the porous body 9. The respective preparation methods will be described.

Examples 1 to 8, Comparative Examples 1 to 2

Formation of DDR Membranes

As separation membranes 33, DDR membranes were formed on the inner wall faces 4s of the cells 4.

(1) Preparation of Seed Crystals

Based on the method for producing DDR-type zeolite as set forth in M. J. den Exter, J. C. Jansen, H. van Bekkum, Studies in Surface Science and Catalysis vol. 84, Ed. by J. Weitkamp et al., Elsevier (1994) 1159-1166 or JP-A-2004-083375, a DDR-type zeolite crystal powder was produced, directly, or if necessary, subjected to grinding, and used as seed crystals. The synthesized or ground seed crystal was dispersed in water, and coarse particles were then removed to prepare a seed crystal dispersion liquid.

(2) Seed Attachment (Particle Adhesion Step)

The seed crystal dispersion liquid prepared in the step (1) was diluted with ion-exchanged water or ethanol, and adjusted so that the DDR concentration was 0.001 to 0.36 mass % (the solid content concentration in the slurry), and stirred at 300 rpm with a stirrer to provide a slurry liquid for seed attachment (slurry). The porous body 9 having pores therein was firmly fixed to a lower end of a wide-mouth funnel, and 160 ml of the slurry liquid for seed attachment was poured from above the porous body 9, and allowed to pass through the cells. The porous body 9 through which the slurry was allowed to flow down was dried by passing air through the inside the cells for 10 to 30 min under the condition at room temperature or 80° C. and a wind speed of 3 to 6 m/s. The flow down of the slurry and the through air drying were repeated once to six times to obtain a sample. After the drying, the microstructure was observed with an electron microscope. It has been confirmed that DDR particles are adhered to the surface of the porous body 9.

(3) Membrane Formation (Membrane Formation Step)

In a 100 ml wide-mouth bottle made of fluorine resin, 7.35 g of ethylene diamine (manufactured by Wako Pure Chemical Industries, Ltd.) was put, and 1.156 g of 1-adamantane amine (manufactured by Aldrich) was then added, and dissolved so as not to leave any precipitation of 1-adamantane amine. In another container, 98.0 g of 30 mass % of colloidal silica (SNOWTEX S manufactured by Nissan Chemical Industries, Ltd.) and 116.55 g of ion-exchanged water were put, lightly stirred, then added to the wide-mouth bottle in which the ethylene diamine and the 1-adamantane amine were mixed, and strongly shaken up to prepare a raw material solution. The molar ratios between the respective constituents in the raw material solution were: 1-adamantane amine/$SiO_2$=0.016; and water/$SiO_2$=21. Thereafter, the wide-mouth bottle with the raw material solution put therein was set in a homogenizer, and stirred for 1 hour. In a stainless-steel pressure resistant vessel with a 300 ml-inner volume inner cylinder of fluorine resin, the porous body 9 to which the DDR particles were adhered in the step (2) was placed, and with the blended raw material solution (sol) put therein, subjected to heat treatment (hydrothermal synthesis) at 140° C. for 50 hours. It is to be noted that the solution was alkaline due to the colloidal silica and ethylene diamine of the raw material during the hydrothermal synthesis. When a fracture cross-section of the porous body 9 with the membrane generated was observed by a scanning electron microscope, the membrane thickness of the DDR membrane was 10 µm or less.

(4) Removal of Structure Directing Agent

The coated membrane was heated with an electric furnace in the air atmosphere for 50 hours at 450° C. higher than the oxidative pyrolysis temperature to burn and remove the 1-adamantane amine in the pores. The crystal phase was identified by X-ray diffraction and was confirmed to be DDR-type zeolite. In addition, after the membrane formation, it was confirmed that the porous body 9 was coated with DDR-type zeolite.

2. Test Method (Method for Calculating Thermal Expansion Amount)

The thermal expansion amounts of the substrate and zeolite membrane (self-supported membrane) were obtained in the following way.

(1) Substrate (Porous Body)

The substrate (porous body) was cut out, and the thermal expansion amounts were measured by a TMA method.

(2) Zeolite Membrane

In a 100 ml (milliliter) wide-mouth bottle made of fluorine resin, 3.64 g of ethylene diamine (manufactured by Wako Pure Chemical Industries, Ltd.) was put, and 0.573 g of 1-adamantane amine (manufactured by Aldrich) was then added, and dissolved so as not to leave any precipitation of 1-adamantane amine. In another container, 28.3 g of 30 mass % of silica sol (SNOWTEX S manufactured by Nissan Chemical Industries, Ltd.) and 41.34 g of ion-exchanged water were put, lightly stirred, then added to the wide-mouth bottle in which the ethylene diamine and the 1-adamantane amine were mixed, and strongly shaken up to prepare a mixed solution. Thereafter, the wide-mouth bottle with the mixed solution put therein was set in a shaker, and shaken up at 500 rpm for 1 hour. Thereafter, 1000 µl (microliter) of a dispersion liquid of DDR-type zeolite powder containing 0.112 mass % of DDR-type zeolite powder was put, and again shaken up at 500 rpm for 5 minutes in the shaker to prepare a raw material solution for membrane formation. In a stainless-steel pressure resistant vessel with a 100 ml-inner volume inner cylinder made of fluorine resin, with a pellet of Teflon (registered trademark) placed therein, the raw material solution for membrane formation was put, and subjected to thermal treatment (hydrothermal synthesis) at 125 to 150° C. for 50 to 100 hours. After the heat treatment, through water washing and drying, the DDR-type zeolite membrane formed on the surface of the pellet was peeled to obtain a self-supported membrane. The thermal expansion amount was measured by a TMA method.

Figure 4:
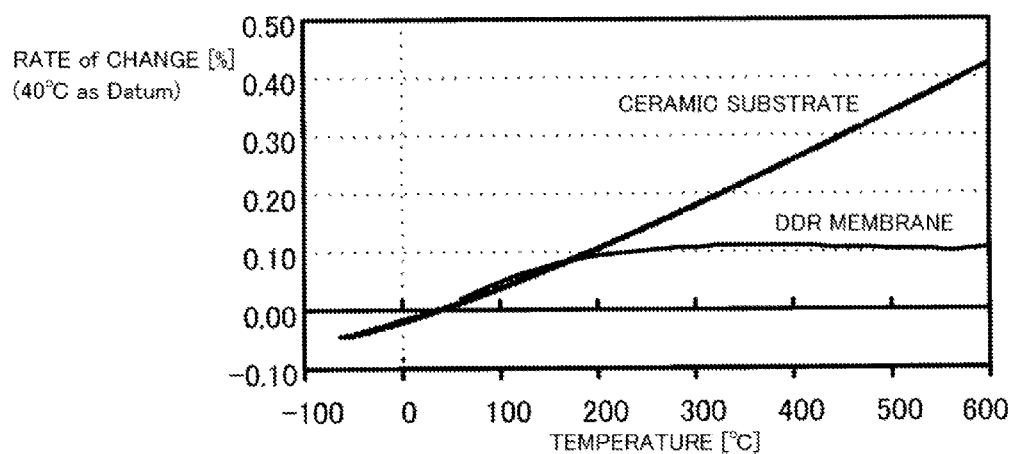
FIG. 4 is a graph showing results on thermal expansion amount test.

FIG. 4 shows the thermal expansion amounts of the substrate (porous body) and zeolite membrane (self-supported membrane). The substrate (porous body) was cut out into a size of 0.5 mm in width×15 mm in length×2 mm in thickness, so as to include a cell portion (surface layer 32) with the zeolite membrane formed. The zeolite membrane (self-supported membrane) was cut out into a size of 0.5 mm in width×15 mm in length×0.5 mm in thickness, and subjected to the measurement by increasing the temperature at 100° C./h with the use of a thermal dilatometer (manufactured by Bruker AXS Inc.). When the difference in ratio of thermal expansion amount between the alumina porous substrate and the DDR-type zeolite membrane at room temperature (40° C.) was regarded as 0%, the difference was 0.01% at 100° C., 0.05% at 200° C., 0.15% at 400° C., 0.23% at 500° C., and 0.32% at 600° C.

($CO_2$ Permeation Amount Measurement, Separation Performance)

The $CO_2$ permeation amount and the separation coefficient were obtained in the following way. A mixed gas of carbon dioxide ($CO_2$) and methane ($CH_4$) (the volume ratio between the respective gases was adapted to 50:50, and the partial pressures of the respective gasses were adapted to 0.2 MPa) was introduced into the cells 4 of the separation membrane structure 1, and the permeation flow rate of the $CO_2$ gas permeating through the separation membrane 33 was measured with a mass flow mater to calculate the $CO_2$ permeation amount. The $CO_2$ permeation amount indicates the $CO_2$ gas treatment performance of the separation membrane 33. The more the $CO_2$ permeation amount increases, the more the treated amount increases, which means a higher performance as a separation membrane.

Furthermore, the gas having permeated through the separation membrane (zeolite membrane) 33 was collected, and subjected to a component analysis with the use of a gas chromatograph, and the separation coefficient was calculated by the formula of "Separation Coefficient $\alpha$=(Permeated $CO_2$ Concentration/Permeated $CH_4$ Concentration)/(Supplied $CO_2$ Concentration/Supplied $CH_4$ Concentration)".

(Definition of Permeation Amount Recovery Rate)

The permeation amount recovery rate of the value of the permeation amount regenerated by heating (after heating) was calculated by the formula of "Permeation Amount Recovery Rate=(Permeation Amount after Heating)/(Permeation Amount before Heating)×100" when the value (before heating) of the permeation amount decreased after hydraulic test (Table 1) and after being left in the air atmosphere for 12 months (Table 2) was regarded as 100%. It is to be noted that the terms of before heating refers to before regeneration, whereas the terms of after heating refers to after regeneration.

(Definition of Oxidative Pyrolysis Temperature of Structure Directing Agent)

The zeolite powder containing the structure directing agent was heated at 10° C./h with the use of a TG measurement system, and the temperature at which a decrease in weight by 90% was caused was defined as the oxidative pyrolysis temperature when the temperature at which the change in weight was convergent (the temperature at which the structure directing agent was all completely subjected to oxidative pyrolysis) was regarded as 100%. The oxidative pyrolysis temperature of the structure directing agent used for the zeolite membranes according to the examples was approximately 425° C.

3-1. Test 1

The hydraulic test was carried out in such a way that the cells 4 of the monolith type separation membrane structure 1 with the DDR membrane formed on the inner wall faces 4s of the cells 4 in the substrate 30 was filled with water, and pressurized with a pump from 1 MPa to 8 MPa for once to ten times. The samples with permeation amount decreased by the hydraulic test were regenerated.

Example 1

The heat treatment condition was adapted to the rate of temperature increase: 25° C./h, the maximum temperature: 100° C., and keeping time: 1 h in an air atmosphere furnace. The separation performance after the heat treatment was not degraded, while the permeation amount recovery rate was 109%.

Example 2

The heat treatment condition was adapted to the rate of temperature increase: 25° C./h, the maximum temperature: 200° C., and keeping time: 1 h in an air atmosphere furnace. The separation performance after the heat treatment was not degraded, and the permeation amount recovery rate was 136%.

Example 3

The heat treatment condition was adapted to the rate of temperature increase: 25° C./h, the maximum temperature: 400° C., and keeping time: 1 h in an air atmosphere furnace. The separation performance after the heat treatment was not degraded, and the permeation amount recovery rate was 190%. The permeation amount was equal to the value immediately after the removal of the templating agent (structure directing agent).

Example 4

The heat treatment condition was adapted to the rate of temperature increase: 25° C./h, the maximum temperature: 500° C., and keeping time: 1 h in an air atmosphere furnace. The separation performance after the heat treatment was not degraded, and the permeation amount recovery rate was 195%. The permeation amount was equal to the value immediately after the removal of the templating agent.

Comparative Example 1

The heat treatment condition was adapted to the rate of temperature increase: 25° C./h, the maximum temperature: 600° C., and keeping time: 1 h in an air atmosphere furnace. The separation performance after the heat treatment was degraded, and the permeation amount recovery rate was 327%. It has been determined that a crack occurred in the zeolite membrane due to the difference in thermal expansion.

TABLE 1

|  | Maximum Temperature of Heat Treatment (° C.) | Difference in Ratio of Thermal Expansion Amount (%) | Permeation Amount (L/min · m²) | Permeation Amount Recovery Rate (%) | Separation Coefficient |
|---|---|---|---|---|---|
| Immediately after removal of templating agent | — | — | 42 | — | 130 |
| After apply of hydraulic pressure | — | — | 22 | 100 | 135 |
| Example 1 | 100 | 0.01 | 23 | 109 | 134 |
| Example 2 | 200 | 0.05 | 30 | 136 | 131 |
| Example 3 | 400 | 0.15 | 42 | 190 | 130 |
| Example 4 | 500 | 0.23 | 43 | 195 | 125 |
| Comparative Example 1 | 600 | 0.32 | 72 | 327 | 2 |

As shown in Table 1, Examples 1 to 4 have succeeded in restoring the permeation amount almost without lowering the separation coefficient.

3-2. Test 2

The samples were left for 12 months in the air atmosphere at room temperature of 5 to 30° C. and humidity of 10 to 90%. The samples with permeation amount decreased by leaving for 12 months in the air atmosphere were regenerated.

Example 5

The heat treatment condition was adapted to the rate of temperature increase: 25° C./h, the maximum temperature: 100° C., and keeping time: 1 h in an air atmosphere furnace. The separation performance after the heat treatment was not degraded, while the permeation amount recovery rate was 105%.

Example 6

The heat treatment condition was adapted to the rate of temperature increase: 25° C./h, the maximum temperature: 200° C., and keeping time: 1 h in an air atmosphere furnace. The separation performance after the heat treatment was not degraded, and the permeation amount recovery rate was 122%.

Example 7

The heat treatment condition was adapted to the rate of temperature increase: 25° C./h, the maximum temperature: 400° C., and keeping time: 1 h in an air atmosphere furnace. The separation performance after the heat treatment was not degraded, and the permeation amount recovery rate was 127%. The permeation amount was equal to the value immediately after the removal of the templating agent.

Example 8

The heat treatment condition was adapted to the rate of temperature increase: 25° C./h, the maximum temperature: 500° C., and keeping time: 1 h in an air atmosphere furnace. The separation performance after the heat treatment was not degraded, and the permeation amount recovery rate was 130%. The permeation amount was equal to the value immediately after the removal of the templating agent.

Comparative Example 2

The heat treatment condition was adapted to the rate of temperature increase: 25° C./h, the maximum temperature: 600° C., and keeping time: 1 h in an air atmosphere furnace. The separation performance after the heat treatment was degraded, and the permeation amount recovery rate was 142%. It has been determined that a crack occurred in the zeolite membrane due to the difference in thermal expansion.

TABLE 2

|  | Maximum Temperature of Heat Treatment (° C.) | Difference in Ratio of Thermal Expansion Amount (%) | Permeation Amount (L/min · m²) | Permeation Amount Recovery Rate (%) | Separation Coefficient |
|---|---|---|---|---|---|
| Immediately after removal of templating agent | — | — | 76 | — | 226 |
| After leaving in air atmosphere | — | — | 60 | 100 | 235 |
| Example 5 | 100 | 0.01 | 63 | 105 | 231 |
| Example 6 | 200 | 0.05 | 73 | 122 | 229 |
| Example 7 | 400 | 0.15 | 76 | 127 | 227 |
| Example 8 | 500 | 0.23 | 78 | 130 | 219 |
| Comparative Example 2 | 600 | 0.32 | 85 | 142 | 10 |

As shown in Table 2, Examples 5 to 8 have succeeded in restoring the permeation amount almost without lowering the separation coefficient.

INDUSTRIAL APPLICABILITY

The method for regenerating a zeolite membrane according to the present invention can be used as a method for regenerating a zeolite membrane which is formed as a separation membrane on a ceramic porous body and subjected to removal treatment of structure directing agent. The method is a method for restoring the zeolite membrane which has been exposed to water.

DESCRIPTION OF REFERENCE NUMERALS

1: separation membrane structure, 1s: sealing portion, 2, 2a, 2b: end face, 3: partition wall, 4: cell, 4a: separation cell, 4b: water collection cell, 6: outer circumferential face, 7: discharge passage, 8: plugging portion, 9: porous body, 11: thermal expansion amount measurement sample, 30: substrate, 31: intermediate layer, 32: surface layer, 33: separation membrane (zeolite membrane).

What is claimed is:

1. A method for regenerating a zeolite membrane formed on a ceramic porous body and subjected to treatment of removing structure directing agent, the method comprising:
heating at a regeneration temperature at which a difference in ratio of thermal expansion amount between the ceramic porous body and the zeolite membrane is 0.3% or less when 40° C. is set as datum.

2. The method for regenerating a zeolite membrane according to claim 1, wherein the regeneration temperature does not exceed an oxidative pyrolysis temperature of the structure directing agent used in the formation of the zeolite membrane.

3. The method for regenerating a zeolite membrane according to claim 1, wherein a rate of temperature increase to the regeneration temperature or a rate of temperature decrease from the regeneration temperature is 1° C./h to 100° C./h.

4. The method for regenerating a zeolite membrane according to claim 1, wherein a keeping time at the regeneration temperature is 10 minutes or longer.

5. The method for regenerating a zeolite membrane according to claim 1, wherein the ceramic porous body has a monolith type shape including a plurality of cells defined and formed by porous partition walls from one end face to the other end face in a longitudinal direction.

6. The method for regenerating a zeolite membrane according to claim 1, wherein the zeolite membrane is a DDR-type zeolite membrane.

7. The method for regenerating a zeolite membrane according to claim 1, wherein heating is performed at the regeneration temperature at which the difference in ratio of thermal expansion amount between the ceramic porous body and the zeolite membrane is 0.05 to 0.23% when 40° C. is set as datum, and
a permeation amount recovery rate, defined by (permeation amount after regeneration of the zeolite membrane)/(permeation amount before regeneration of the zeolite membrane)×100, of gas that permeates through pores of the zeolite membrane is 120% or higher.

8. The method for regenerating a zeolite membrane according to claim 7, wherein the gas that permeates through the pores of the zeolite membrane is any of $H_2$, He, $N_2$, $CO_2$, and $CH_4$.

* * * * *